(12) United States Patent
Chang

(10) Patent No.: US 7,530,082 B2
(45) Date of Patent: May 5, 2009

(54) DISK RECORDING AND/OR REPRODUCING APPARATUS

(75) Inventor: Chin-Chia Chang, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 346 days.

(21) Appl. No.: 11/309,382

(22) Filed: Aug. 2, 2006

(65) Prior Publication Data

US 2007/0079314 A1 Apr. 5, 2007

(30) Foreign Application Priority Data

Sep. 30, 2005 (TW) .................................. 94134342

(51) Int. Cl.
*G11B 17/04* (2006.01)
(52) U.S. Cl. ...................................... 720/648
(58) Field of Classification Search ................. 720/648, 720/655, 602, 601, 651, 725, 649, 650
See application file for complete search history.

(56) References Cited

U.S. PATENT DOCUMENTS

| 5,200,945 | A | * | 4/1993 | Engler et al. .................. 369/99 |
| 6,791,790 | B2 | | 9/2004 | Lee |
| 6,948,176 | B2 | | 9/2005 | Cho et al. |
| 6,952,833 | B2 | * | 10/2005 | Chang ........................ 720/648 |
| 2003/0128645 | A1 | * | 7/2003 | Cho et al. .................. 369/75.1 |
| 2003/0210635 | A1 | * | 11/2003 | Sato et al. .................. 369/75.1 |
| 2004/0163093 | A1 | * | 8/2004 | Chang ........................ 720/648 |
| 2005/0050567 | A1 | * | 3/2005 | Takizawa et al. ............ 720/655 |
| 2005/0086675 | A1 | * | 4/2005 | Lee et al. .................... 720/648 |
| 2005/0094313 | A1 | * | 5/2005 | Kim ........................ 360/97.02 |
| 2005/0185325 | A1 | * | 8/2005 | Hur ........................ 360/97.02 |
| 2006/0048171 | A1 | * | 3/2006 | Lin et al. .................... 720/648 |
| 2006/0053429 | A1 | * | 3/2006 | Hsieh et al. ................. 720/648 |
| 2006/0259917 | A1 | * | 11/2006 | Tokunaga ................... 720/649 |
| 2007/0047138 | A1 | * | 3/2007 | Han et al. ................ 360/97.02 |

* cited by examiner

*Primary Examiner*—Allen T Cao
(74) *Attorney, Agent, or Firm*—Winston Hsu

(57) ABSTRACT

A disk recording and/or reproducing apparatus includes a main body, a cover, a closable opening, at least one disrupting portion and at least one guiding portion. The main body includes a motor being accommodated therein for rotating a disk. The cover is coupled with the main body. The opening is defined between the cover and the main body for the disk to be loaded therethrough. The disrupting portion protrudes from the cover towards the main body for disrupting airflow generated by the rotating disk. The guiding portion protrudes from the cover towards the main body for guiding the airflow.

20 Claims, 10 Drawing Sheets

DISK RECORDING AND/OR REPRODUCING APPARATUS

FIELD OF THE INVENTION

The present invention relates to a disk recording and/or reproducing apparatus and, more particularly, to a disk recording and/or reproducing apparatus with low vibration properties.

DESCRIPTION OF RELATED ART

With rapid development of optical recording and/or reproducing technologies, a rotation speed of a disk driven by a motor of a disk recording and/or reproducing apparatus has become faster and faster. When the disk rotates, airflow occurs because of friction between surfaces of the disk and surrounding air. The disk rotates faster and a velocity gradient and a pressure gradient of airflow are greater, resulting in unwanted vibrations.

Referring to FIG. 1, a general disk recording and/or reproducing apparatus 140 is illustrated. The disk recording and/or reproducing apparatus 140 includes a cover 80 and a main body 82 covered by the cover 80. The cover 80 includes a damper 800 and four disrupting protrusions 802 protruding toward the main body 82. A disk 90 is loaded between the cover 80 and the main body 82. These disrupting protrusions 802 extend radially from a periphery of the damper 800 and extend along radial directions of the disk 90. When the disk 90 rotates at a high speed, the airflow is disrupted by these disrupting protrusions 802. Therefore, vibrations are reduced to some extent because of the disrupting protrusions 802 that act as a vibration damping structure.

However, the vibrations generated because of airflow in the disk recording and/or reproducing apparatus 140 is not dampened enough because the disrupting protrusions 802 merely redirects airflow in an organized manner.

Therefore, a disk recording and/or reproducing apparatus with low vibration properties is desired.

SUMMARY OF THE INVENTION

A disk recording and/or reproducing apparatus includes a main body, a cover, a closable opening, at least one disrupting portion and at least one guiding portion. The main body includes a motor being accommodated therein for rotating a disk. The cover is coupled with the main body. The opening is defined between the cover and the main body for the disk to be loaded therethrough. The disrupting portion protrudes from the cover towards the main body for disrupting airflow generated by the rotating disk. The guiding portion protrudes from the cover towards the main body for guiding the airflow.

Other advantages and novel features will become more apparent from the following detailed description of preferred embodiments when taken in conjunction with the accompanying drawings, in which:

DETAILED DESCRIPTION OF THE INVENTION

Figure 1:
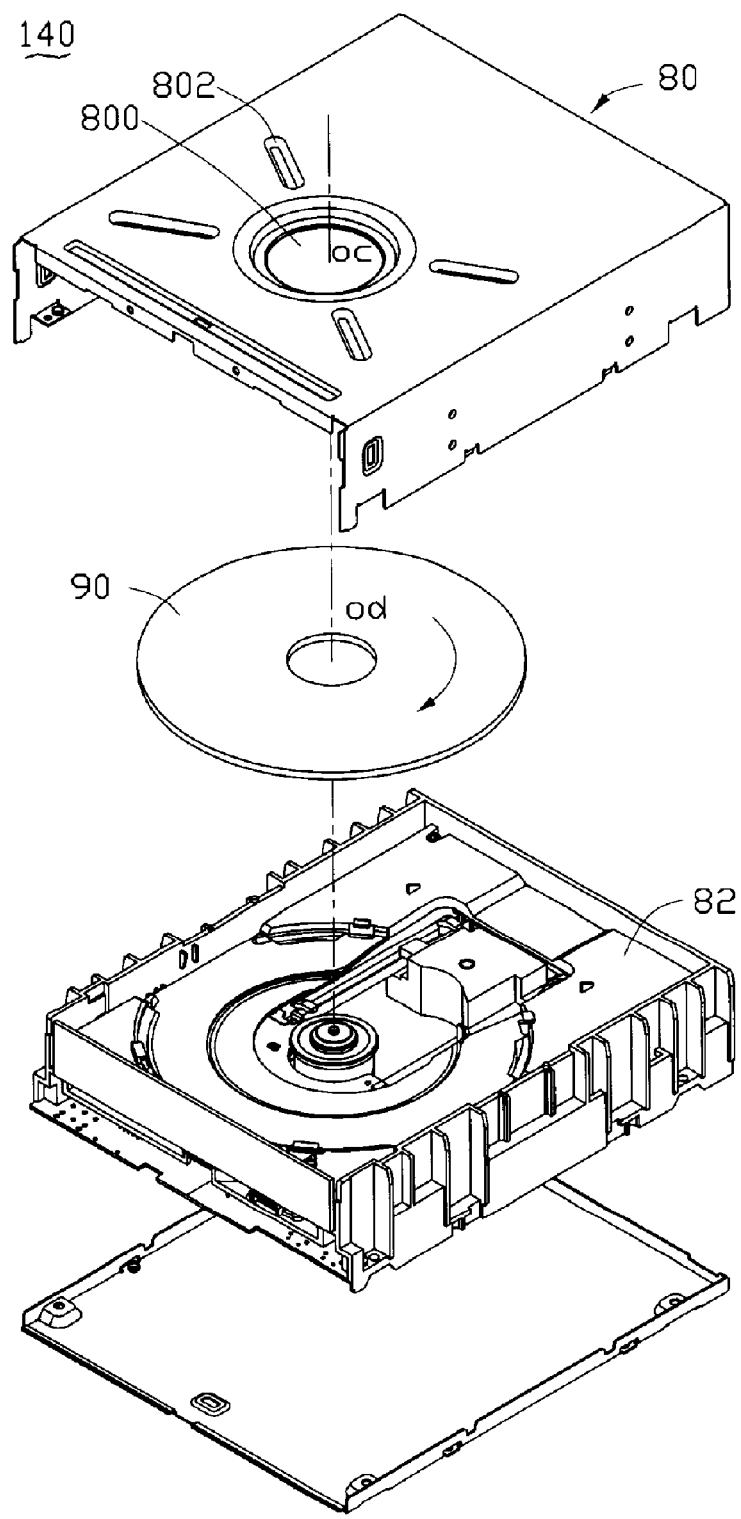
FIG. 1 is an exploded, isometric view of a general disk recording and/or reproducing apparatus.
Figure 2:
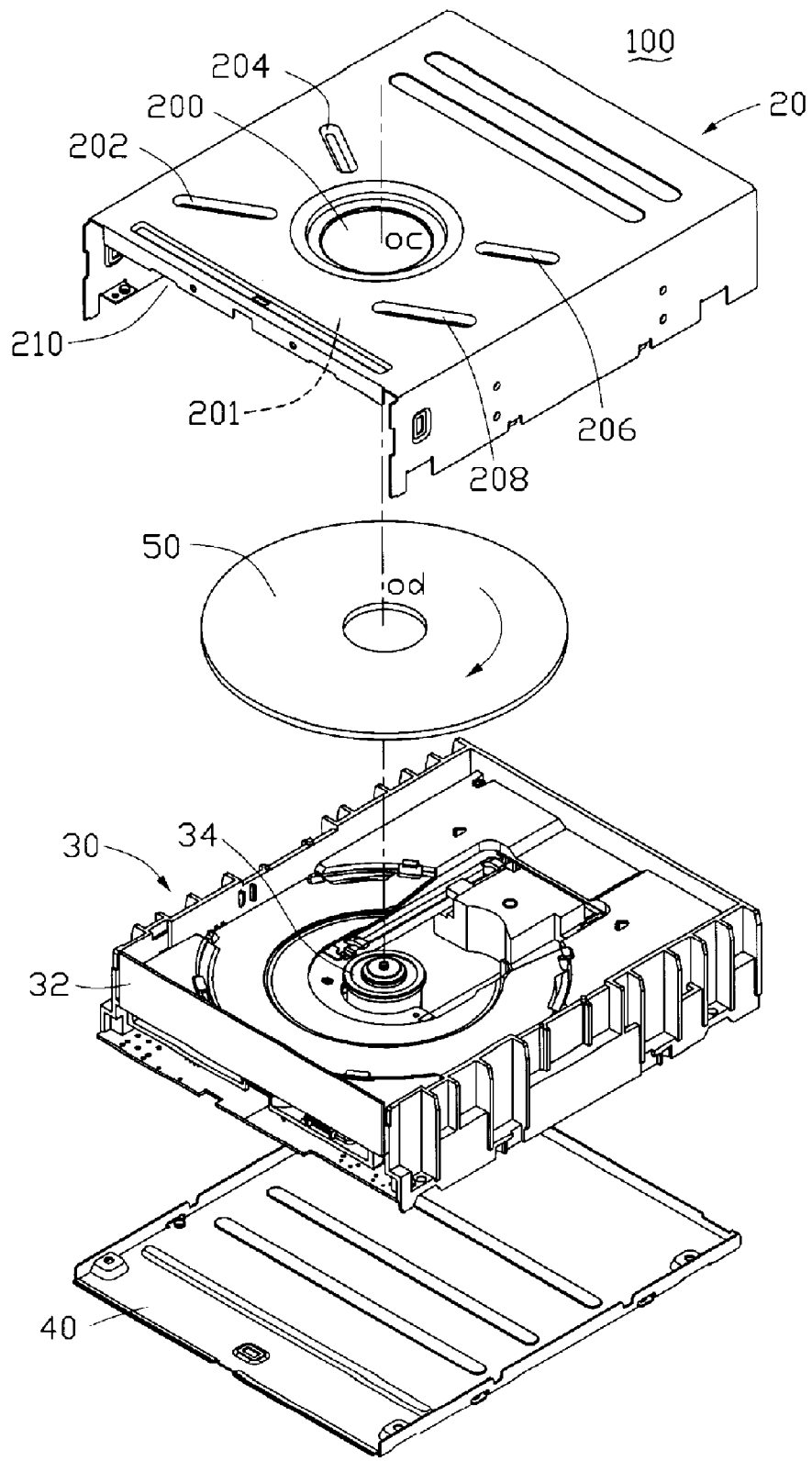
FIG. 2 is an exploded, isometric view of a disk recording and/or reproducing apparatus in accordance with a first exemplary embodiment.
Figure 3:
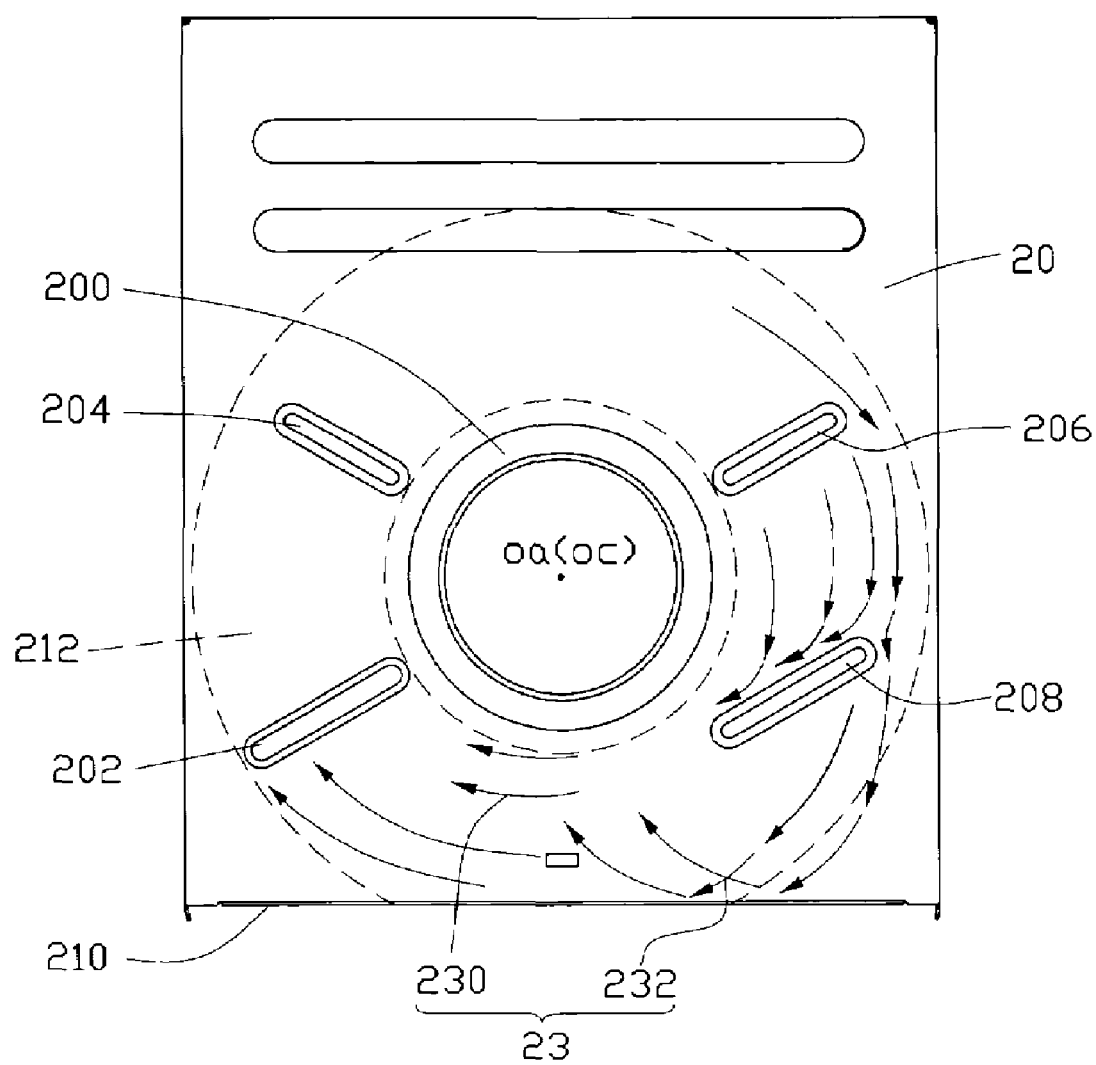
FIG. 3 is a top view of the disk recording and/or reproducing apparatus of FIG. 2
Figure 4:
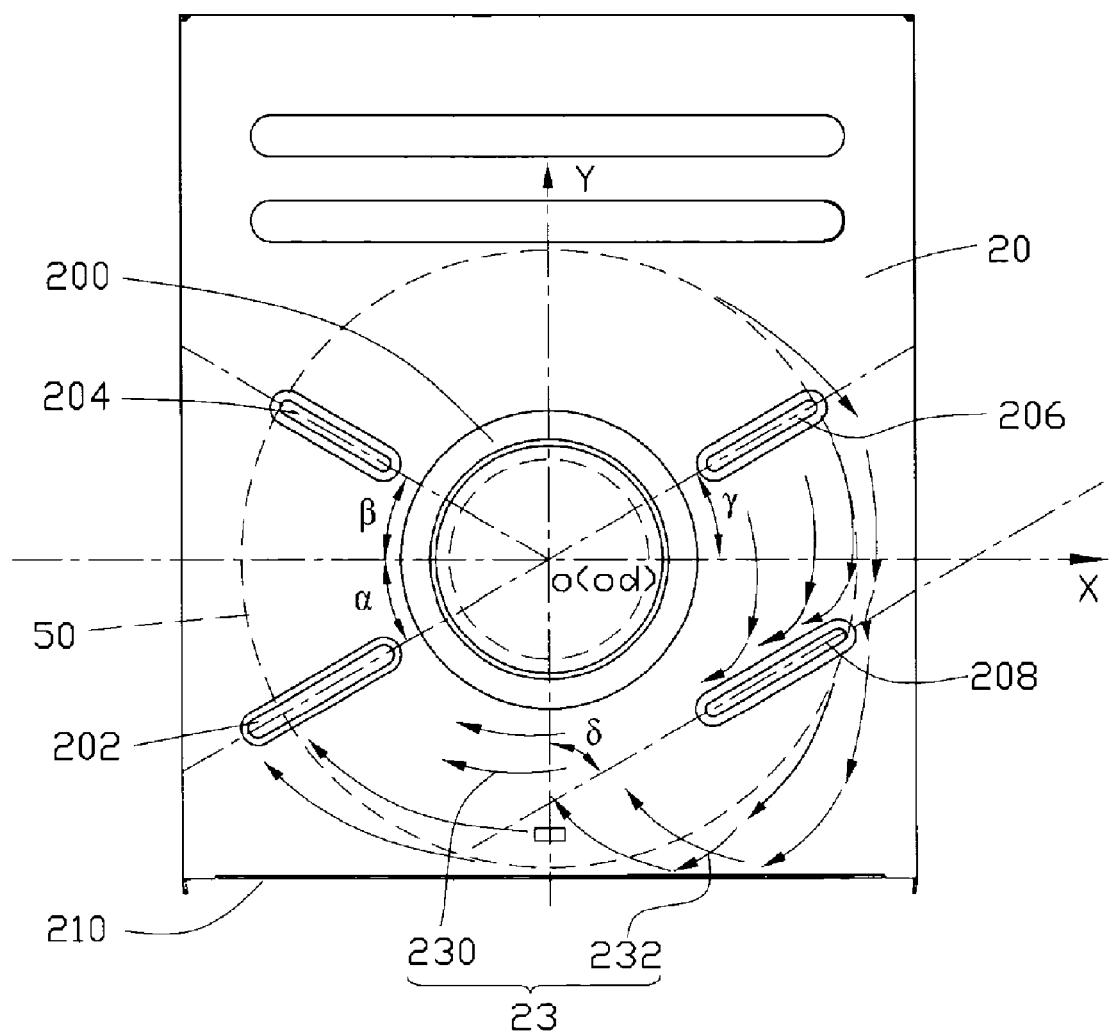
FIG. 4 is a top view of the disk recording and/or reproducing apparatus of FIG. 2, with a disk being loaded therein.

Referring to FIGS. 2 to 4, a disk recording and/or reproducing apparatus 100 includes a cover 20, a main body 30, and a base shell 40. The cover 20 and the base shell 40 enclose the main body 30 from its two opposite sides. An opening 210 that is closable is defined between the cover 20 and the main body 30 for a disk 50 being loaded/unloaded therethrough. The main body 30 includes a panel 32 and a motor 34. The panel 32 is a sidewall that can open/close the opening 210 of the cover 20 after the disk 50 is loaded/unloaded. The motor 34 can rotate the disk 50 at a high speed. When the disk 50 is rotated, airflow 23 is generated because of friction between surfaces of the disk 50 and surrounding air.

The cover 20 is a plate and includes a damper 200 for clamping the disk 50, a bottom side 201, a first disrupting portion 202, a second disrupting portion 204, a third disrupting portion 206, and a guiding portion 208. The first, second, and third disrupting portions 202, 204, and 206 protrude from the bottom side 201 of the cover 20 toward the main body 30, and radiate from a periphery of the clamper 200. That is, the first, second, and third disrupting portions 202, 204, and 206 extend along radial directions of the disk 50. The first, second, and third disrupting portions 202, 204, and 206 are arranged within an annulus 212 for disrupting the airflow 23. A center Oa of the annulus 212 is defined by an orthographic projection of a rotation center Oc of the damper 200 on the cover 20. An inner radius of the annulus 212 is 0.5 multiplied a radius of the disk 50. An outer radius of the annulus 212 is 1.1 multiplied a radius of the disk 50. Therefore, a width of the annulus 212 is 0.6 multiplied a radius of the disk 50. The first, second, and third disrupting portions 202, 204, and 206 are all bar strips with lengths being larger than or equal to 25 millimeters whilst widths and thicknesses being larger than or equal to 3 millimeters. A longitudinal length of the first disrupting portion 202 is greater than those of the second and third disrupting portions 204 and 206.

The guiding portion 208 protrudes from the bottom side 201 of the cover 20 towards the main body 30, and arranged at the annulus 212 for guiding the airflow 23. The guiding portion 208 is also a bar strip and is parallel to the first and second disrupting portions 202 and 206. A length of the guiding portion 208 is larger than or equal to 25 millimeters whilst a width and a thickness of the guiding portion 208 are larger than or equal to 3 millimeters. A longitudinal length of the guiding portion 208 equals to that of the first disrupting portion 202.

Referring to FIG. 4 again, a top view of the disk recording and/or reproducing apparatus 100 is illustrated. In order to distinctly describe detailed locations of the first, second, and third disrupting portions 202, 204, and 206, and the guiding portion 208, a Cartesian coordinate system XOY is presented as a reference and is shown in FIG. 4. A reference axis Y is defined along a direction the disk 50 loaded in. A reference axis X is defined by a clockwise, 90 degrees rotation of the reference axis Y. The reference axis X and the reference axis Y orthogonally intersect at an origin O defined by an orthographic projection of a rotation center Od of the disk 50 on the cover 20. The reference axis X and the reference axis Y divide the cover 20 into four quadrants designated as a first quadrant, a second quadrant, a third quadrant and a fourth quadrant counting counterclockwise from the quadrant in which X and Y coordinates are positive.

The first disrupting portion 202 is positioned in the third quadrant and is proximate to the opening 210. An acute angle α defined by a longitudinal center axis of the first disrupting portion 202 and the reference axis X is approximately 30 degrees. The second disrupting portion 204 is positioned in the second quadrant. An acute angle β defined by a longitudinal center axis of the second disrupting portion 204 and the reference axis is approximately 30 degrees. The third disrupting portion 206 is positioned in the first quadrant. The third disrupting portion 206 and the second disrupting portion 204 are symmetrically arranged with respect to the reference axis Y. That is, an acute angle γ defined between a longitudinal center axis of the third disrupting portion 206 and the reference axis X is also approximately 30 degrees.

The guiding portion 208 is positioned in the fourth quadrant and is parallel to the first disrupting portion 202. An acute angle δ defined between a longitudinal center axis of the guiding portion 208 and the reference axis Y (i.e. the path the disk 50 is loaded in) is greater than 0 degrees and less than 90 degrees. The angle δ is 60 degrees in the present embodiment. The guiding portion 208 is adjacent to the opening 210.

Referring to FIG. 3 again, flowing patterns of the airflow 23 is illustrated when the disk 50 is rotating. Although the disk 50 rotates at a high speed, a speed grad and a pressure grad of the airflow 23 are low because of air disruptions by the first disrupting portion 202, the second disrupting portion 204, the third disrupting portion 206, and an air guidance of the guiding portion 208. The airflow 23 is first disrupted by the third disrupting portion 206 before flowing to the guiding portion 208. The guiding portion 208 divides the airflow 23 into an inner airflow 230 and an outer airflow 232. The inner airflow 230 flows through an inner area defined between the origin O and the guiding portion 208 and the outer airflow 232 flows through an outer area defined between the guiding portion 208 and the opening 210 that is closed by the panel 32. The inner airflow 230 flows to the first disrupting portion 202 for being further disrupted. The outer airflow 232 impacts the opening 210 (the panel 32, in fact) and is deflected to collide with the inner airflow 230 before flowing to the first disrupting portion 202, thus causing more disruptions to the airflow.

A flux of the outer airflow 232 is less than that of the inner airflow 230 and thus only a little of the outer airflow 232 directly disrupts the inner airflow 230. A longitudinal length of the first disrupting portion 202 is greater than those of the second and third disrupting portion 204 and 206 so that the first disrupting portion 202 can effectively disrupt the airflow 23 from the guiding portion 208. The first, second, and third disrupting portions 202, 204, and 206, and the guiding portion 208 act as a vibration damping structure. Accordingly, vibrations caused by the airflow 23 are greatly reduced.

Figure 5:
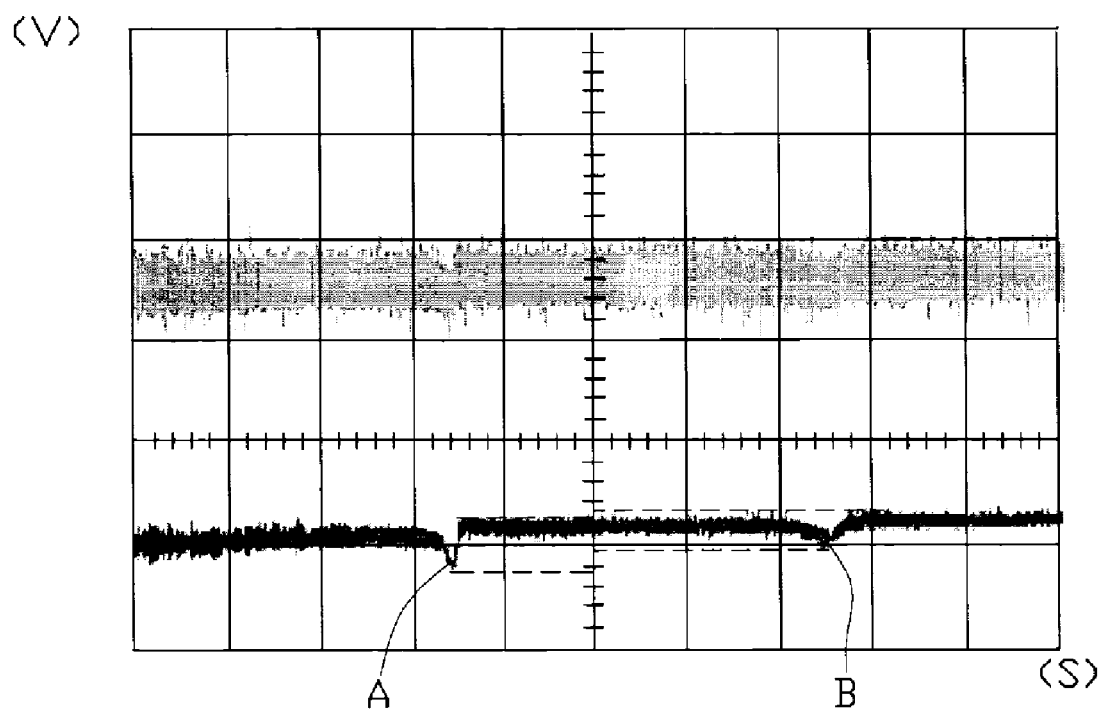
FIG. 5 is a graph showing vibration status of the disk recording and/or reproducing apparatus of FIG. 4.

Referring also to FIG. 5, a vibration status of the present embodiment measured by a laser displacement measurer is illustrated. Upper curves represent original signals show the vibration status. Lower curves represent the original signals with high frequency signals being removed therefrom. A reference axis S represents time. Each interval on the axis S represents 20 seconds. There are ten S intervals and so a total measuring time is 200 seconds. A reference axis V represents voltage. Each interval on the axis V represents 0.1 volts that are equivalent to 0.1 mm vibration displacements. In accordance with the lower curves, peak values of vibration displacements approximately appear at point A (0.05 mm) and point B (0.03 mm) during the total measuring time of 200 seconds.

Figure 6:
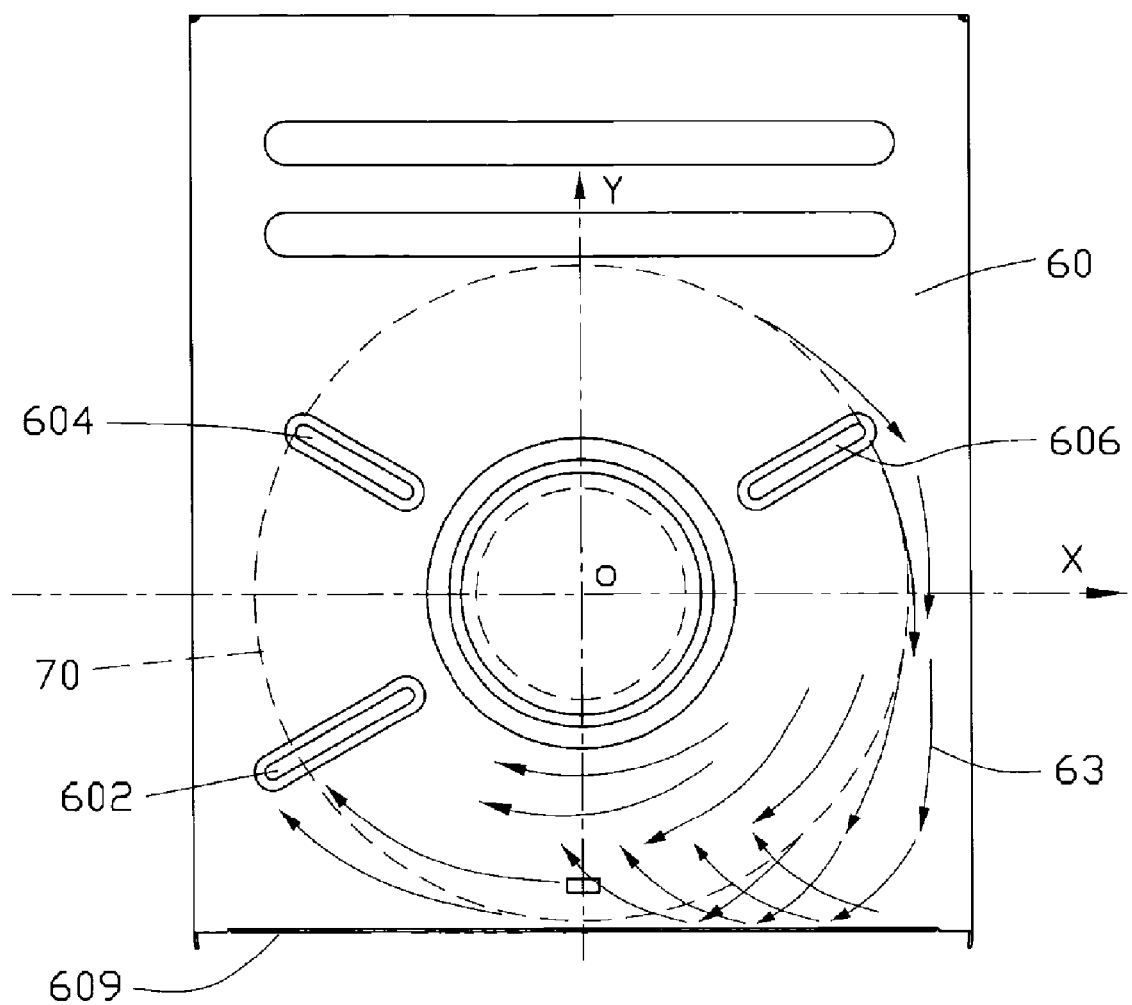
FIG. 6 is a top view of the disk recording and/or reproducing apparatus of FIG. 2, with a guiding portion being removed and a disk being loaded therein.
Figure 7:
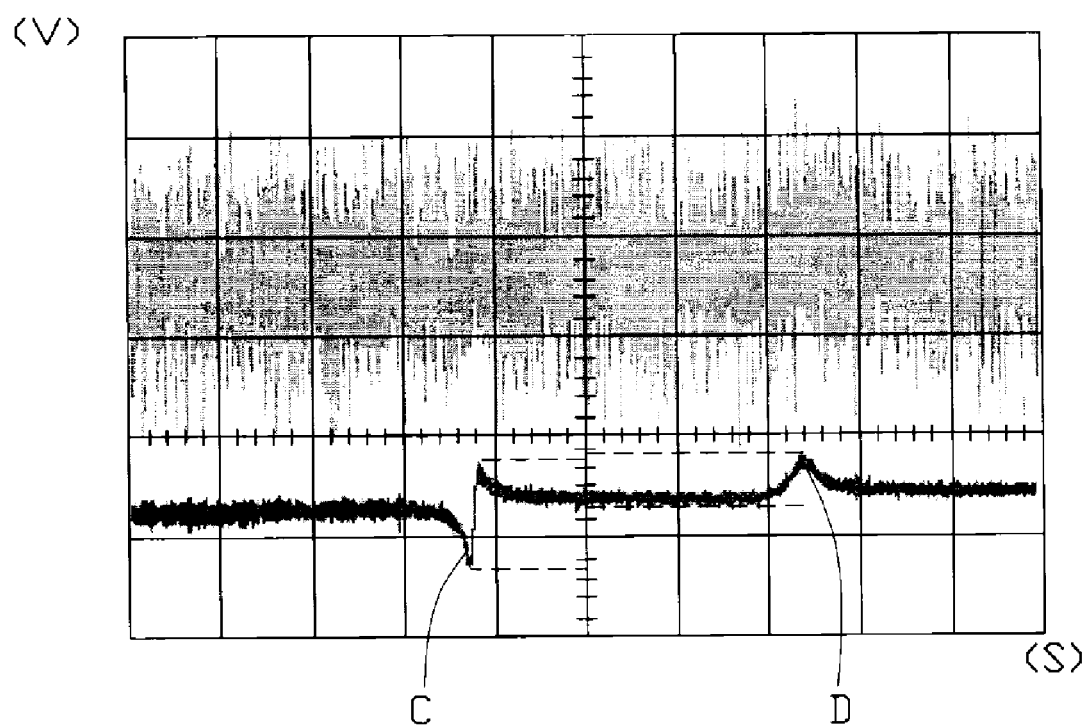
FIG. 7 is a graph showing vibration status of the disk recording and/or reproducing apparatus of FIG. 6.

Referring also to FIGS. 6 and 7, a disk recording and/or reproducing apparatus 120 is provided as a testing model for a comparison with the present embodiment. The disk recording and/or reproducing apparatus 120 includes a cover 60 with a first disrupting portion 602, a second disrupting portion 604, and a third disrupting portion 606. An opening 609 is closably defined in the front of the cover 60 for a disk 70 being loaded therethrough. A Cartesian coordinate system XOY is also presented as a reference. Arrangements and constructions of the first disrupting portion 602, the second disrupting portion 604, and the third disrupting portion 606 are similar to those of the first disrupting portion 202, the second disrupting portion 204, and the third disrupting portion 206. Much more airflow 63 deflects from the opening 609 to cause greater collision force because of an absence of the guidance portion 208. In accordance with lower curves in FIG. 6, the larger displacements approximately appear at point C (0.12 mm) and point D (0.06 mm) during the total measuring time of 200 seconds. Accordingly, the vibration of the disk 70 in the disk recording and/or reproducing apparatus 120 is greater than that of the disk 50 in the disk recording and/or reproducing apparatus 100.

Figure 8:
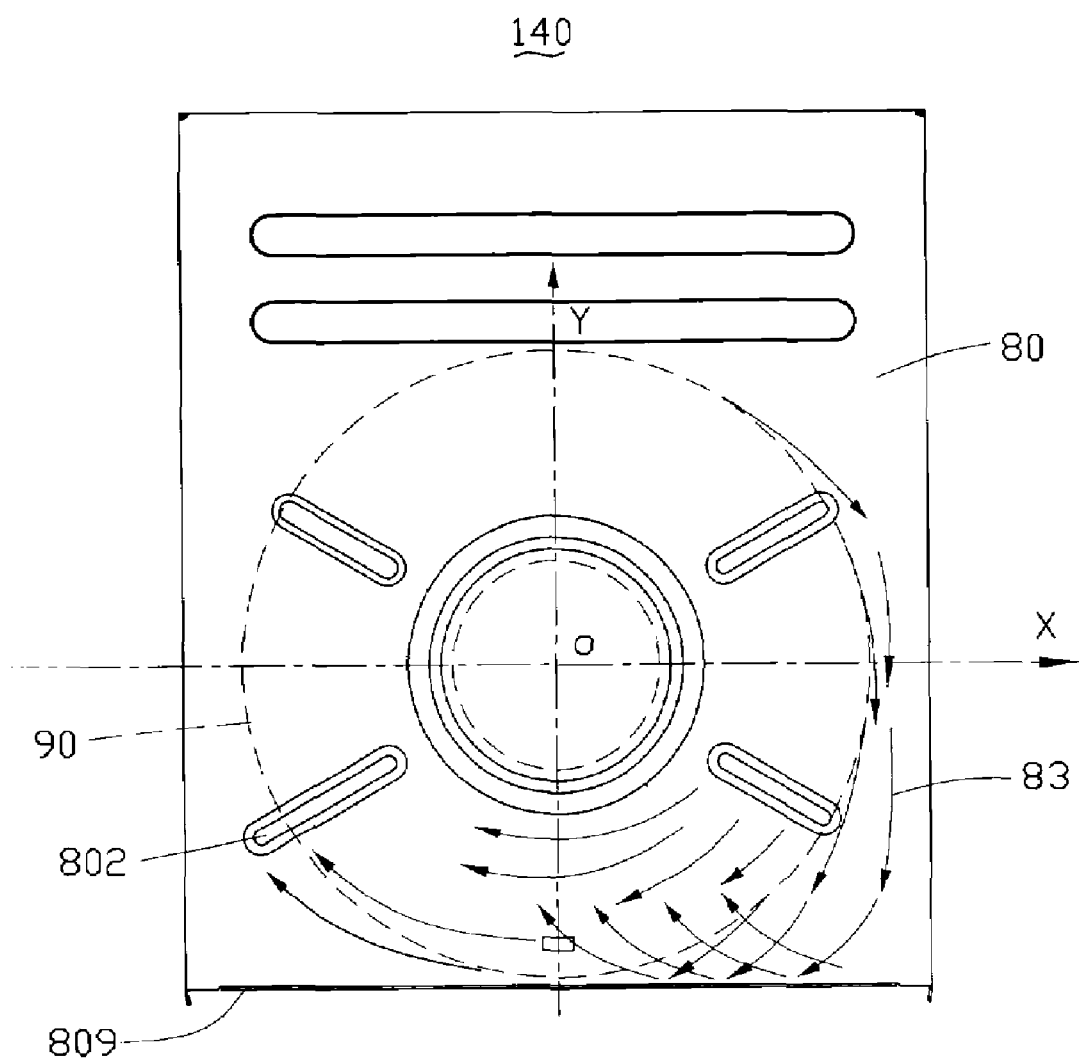
FIG. 8 is a top view of the disk recording and/or reproducing apparatus of FIG. 1, with a disk being loaded therein.
Figure 9:
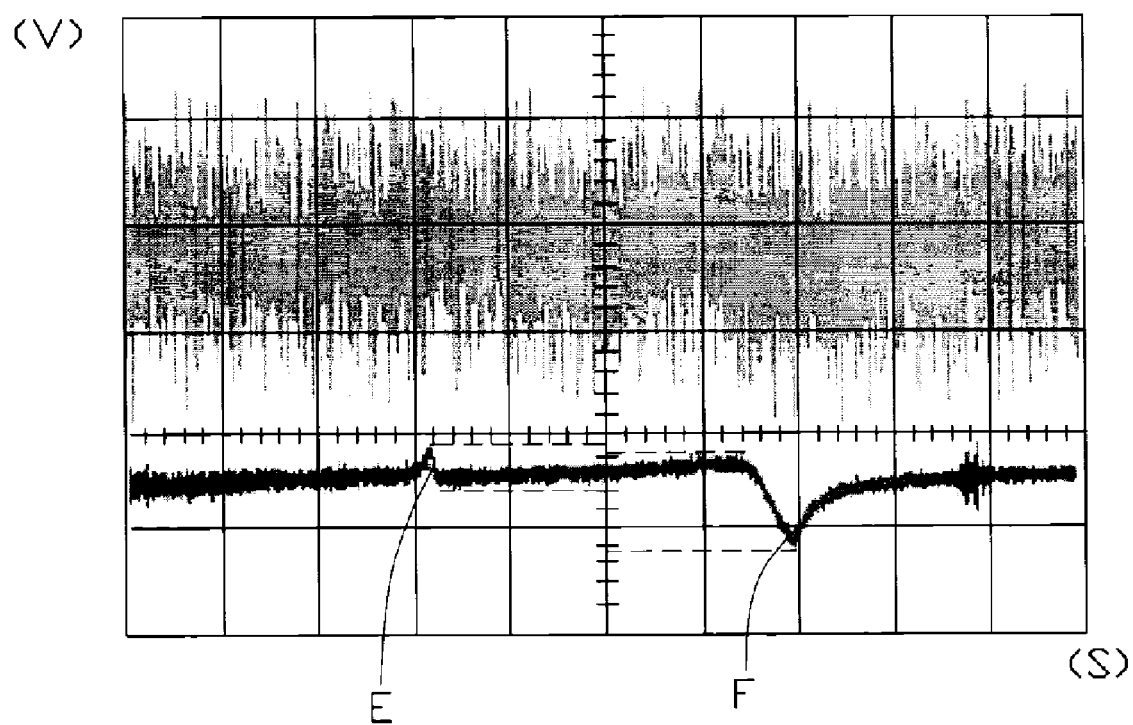
FIG. 9 is a graph showing vibration status of the disk recording and/or reproducing apparatus of FIG. 1.

Referring also to FIGS. 8 and 9, a disk recording and/or reproducing apparatus 140 illustrated in [Description of related art] is provided as a comparison with the present embodiment. The disk recording and/or reproducing apparatus 140 includes a cover 80 with four disrupting protrusions 802. A disk 90 is loaded under the cover 80. The Cartesian coordinate system XOY is also presented as a reference. The four disrupting protrusions 802 are arranged in four corresponding quadrants. Much more airflow 83 deflects from the opening 809 to cause greater collision force in the airflow 83. In accordance with lower curves in FIG. 8, the larger displacements approximately appear at point E (0.05 mm) and point F (0.1 mm) during the total measuring time of 200 seconds. Accordingly, the vibration of the disk 90 in the disk recording and/or reproducing apparatus 140 is greater than that of the disk 50 in the disk recording and/or reproducing apparatus 100.

Figure 10:
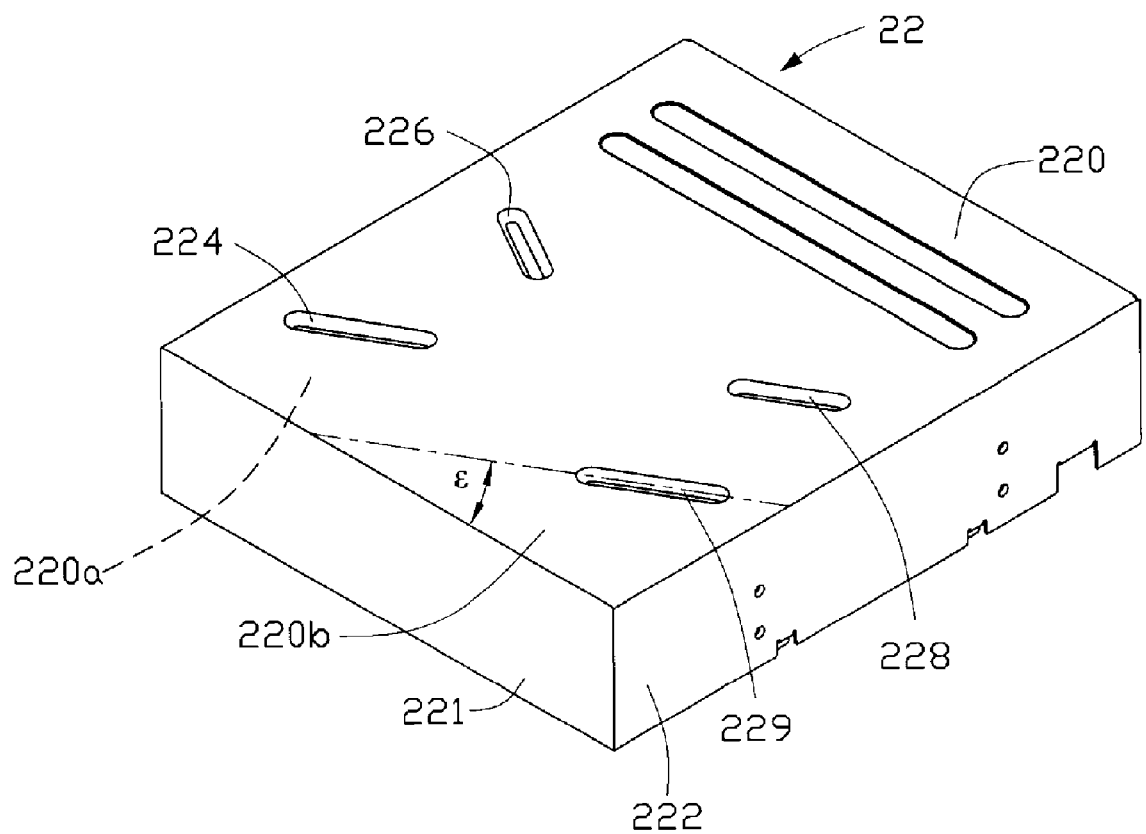
FIG. 10 is an isometric view of a casing of a disk recording and/or reproducing apparatus in accordance with a second exemplary embodiment.

The first disrupting portion 202, the second disrupting portion 204, the third disrupting portion 206, and the guiding portion 208 may be straight protrusions or crankle protrusions. A quantity of the first disrupting portion 202, the second disrupting portion 204, the third disrupting portion 206, and the guiding portion 208 may be one or more. The second disrupting portion 204, the third disrupting portion 206 may be omitted. The guiding portion 208 may be arranged at other quadrants besides the fourth quadrant. The opening 210 may be omitted. Referring also to FIG. 10, the cover 20 may be a casing 22 and includes a plate 220, a first and a second sidewalls 221 and 222 perpendicularly extending from two adjacent peripheries of the plate 220. The first and second sidewalls 221 and 222 are substantially perpendicular to each other. The first disrupting portion 224, the second disrupting portion 226, the third disrupting portion 228, and the guiding portion 229 are positioned on a bottom side 220a of the plate 220. The first disrupting portion 224 and the guiding portion 229 are juxtaposed with each other and arranged at a same side of the sidewall 224. A longitudinal center axis of the guiding portion 229, the first and second sidewalls 221 and 222 define a triangle 222b. An angle ε between the longitudinal center axis of the guiding portion 229 and the first sidewall 221 is greater than 0 degree and less than 90 degrees.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A disk recording and/or reproducing apparatus comprising:
   a main body comprising a motor accommodated therein for rotating a disk;
   a cover coupled with the main body; a closable opening defined between the cover and the main body for the disk being loaded/unloaded therethrough;
   at least one first disrupting portion protruding from the cover towards the main body for partially reflecting back original airflow generated by the rotating disk ans surrounding air, and causing the reflected airflow to collide with the original airflow so as to disrupt the original airflow generated by the rotating disk; and
   at least one guiding portion protruding from the cover towards the main body for guiding the airflow.

2. The disk recording and/or reproducing apparatus as claimed in claim 1, wherein the at least one guiding portion is adjacent to the opening, the at least one guiding portion is configured in a path that guides the airflow towards the opening before deflecting to the at least one first disrupting portion.

3. The disk recording and/or reproducing apparatus as claimed in claim 2, wherein the at least one guiding portion is juxtaposed with the at least one first disrupting portion, the at least one guiding portion and the at least one first disrupting portion are positioned at the same side of the opening, the airflow flowing towards the opening is then deflected to the at least one first disrupting portion for being further disrupted.

4. The disk recording and/or reproducing apparatus as claimed in claim 3, wherein the at least one guiding portion is parallel to the at least one first disrupting portion.

5. The disk recording and/or reproducing apparatus as claimed in claim 4, wherein an angle defined by a longitudinal center axis of the at least one guiding portion and a path the disk is loaded in is greater than 0 degree and less than 90 degrees.

6. The disk recording and/or reproducing apparatus as claimed in claim 1, wherein the at least one guiding portion and the at least one first disrupting portion are arranged within an annulus defined on the cover, an inner radius of the annulus is approximately 0.5 multiplied a radius of the disk, an outer radius of the annulus is approximately 1.1 multiplied the radius of the disk.

7. The disk recording and/or reproducing apparatus as claimed in claim 1, further comprising at least one second disrupting portion protruding from the cover towards the main body and extending along a radial direction of the disk for disrupting the airflow, the at least one second disrupting portion being diagonally arranged with respect to the at least one guiding portion.

8. The disk recording and/or reproducing apparatus as claimed in claim 7, further comprising and at least one third disrupting portion protruding from the cover towards the main body and extending along a radial direction of the disk for disrupting the airflow, the at least one third disrupting portion being diagonally arranged with respect to the at least one first disrupting portion.

9. The disk recording and/or reproducing apparatus as claimed in claim 8, wherein a longitudinal length of at least one guiding portion is substantially greater than those of the at least one second disrupting portion and the at least one third disrupting portion.

10. The disk recording and/or reproducing apparatus as claimed in claim 1, wherein a longitudinal length of the at least one guiding portion substantially equals to that of the at least one first disrupting portion.

11. A vibration damping structure for a disk recording and/or reproducing apparatus, the vibration damping structure comprising:
    a plate;
    at least one first disrupting protrusion formed on a bottom side of the plate for partially reflecting back original airflow to collide with the original airflow flowing to the at least one first disrupting portion, so as to disrupt the original airflow caused by the rotation disk under the plate; and
    at least one guiding protrusion formed on the bottom side of the plate for guiding the airflow.

12. The vibration damping structure as claimed in claim 11, wherein a first and a second sidewalls respectively perpendicularly extending from two adjacent peripheries of the plate for shielding the at least one guiding protrusion.

13. The vibration damping structure as claimed in claim 12, wherein the at least one guiding protrusion is adjacent to the first sidewall, the at least one guiding protrusion is configured in a path that guides the airflow towards the first sidewall before deflecting to the at least one disrupting protrusion.

14. The vibration damping structure as claimed in claim 13, wherein the at least one guiding protrusion is juxtaposed with the at least one first disrupting protrusion, the at least one guiding protrusion and the at least one first disrupting protrusion are positioned at the same side of the first sidewall.

15. The vibration damping structure as claimed in claim 14, wherein the at least one guiding protrusion is parallel to the at least one first disrupting protrusion.

16. The vibration damping structure as claimed in claim 14, wherein a longitudinal center axis of the at least one guiding protrusion, the first sidewall and the second sidewall are capable of defining a triangle.

17. The vibration damping structure as claimed in claim 11, wherein the at least one guiding protrusion and the at least one first disrupting protrusion are arranged within an annulus defined on the plate, an inner radius of the annulus is approximately 0.5 multiplied a radius of the disk, an outer radius of the annulus is approximately 1.1 multiplied the radius of the disk.

18. The vibration damping structure as claimed in claim 11, further comprising at least one second disrupting protrusion protruding from the plate towards the disk and extending along the radial direction of the disk for disrupting the airflow, the at least one second disrupting protrusion being diagonally arranged with respect to the at least one guiding protrusion.

19. The vibration damping structure as claimed in claim 18, further comprising at least one third disrupting protrusion protruding from the plate towards the disk and extending along the radial direction of the disk for disrupting the airflow, the at least one third disrupting protrusion being diagonally arranged with respect to the at least one first disrupting protrusion.

20. The vibration damping structure as claimed in claim 19, wherein longitudinal lengths of the at least one guiding protrusion and the at least one first disrupting protrusion are substantially greater than those of the at least one second disrupting protrusion and the at least one third disrupting protrusion.

* * * * *